US 12,547,966 B2

(12) United States Patent
Fox-Rabinovitz et al.

(10) Patent No.: US 12,547,966 B2
(45) Date of Patent: Feb. 10, 2026

(54) DYNAMIC PURCHASE INTERFACE FOR REAL-TIME MIDDLE-MILE PURCHASE AND DELIVERY

(71) Applicant: Torc Robotics, Inc., Blacksburg, VA (US)

(72) Inventors: Joseph R. Fox-Rabinovitz, Blacksburg, VA (US); Akshay Pai Raikar, Blacksburg, VA (US); William Davis, Blacksburg, VA (US); Justin Yurkanin, Blacksburg, VA (US); Dakota James Hebert, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/408,886

(22) Filed: Jan. 10, 2024

(65) Prior Publication Data
US 2025/0225470 A1 Jul. 10, 2025

(51) Int. Cl.
*G06Q 30/08* (2012.01)
*G06Q 10/083* (2023.01)
(Continued)

(52) U.S. Cl.
CPC ......... *G06Q 10/083* (2013.01); *G06Q 10/087* (2013.01); *G06Q 30/0641* (2013.01)

(58) Field of Classification Search
CPC . G06Q 10/083; G06Q 10/087; G06Q 30/0641
(Continued)

(56) References Cited

U.S. PATENT DOCUMENTS 9,305,280 B1 4/2016 Berg et al.
10,225,190 B2 * 3/2019 Webb .................... H04W 4/021
(Continued)

FOREIGN PATENT DOCUMENTS

WO WO-2016164577 A1 * 10/2016 ......... G06Q 10/0832
WO WO-2023219819 A1 * 11/2023 ........... G06Q 10/047

OTHER PUBLICATIONS

Galarza, Daniela, "San Francisco Declares War on Food Delivery Robots", May 17, 2017, eater.com, 3 pages (Year: 2017).*
(Continued)

*Primary Examiner* — Shannon S Campbell
*Assistant Examiner* — Freda A Nelson
(74) *Attorney, Agent, or Firm* — Armstrong Teasdale LLP (57) ABSTRACT

Disclosed herein are systems and methods generating a dynamic purchase interface within an on-demand purchase app installed and executed on a client device. An inventory management system (IMS) is configured to store, for each inventory unit within an automated vehicle, an inventory record, and to monitor a location of the automated vehicle as the automated vehicle travels along a predetermined travel route. The IMS is also configured to receive, from the client device, a request for generation of the dynamic purchase interface within the on-demand purchase app executed at the client device, and, in response to the request, identify a delivery location associated with the client device, and cause display of the dynamic purchase interface within the on-demand purchase app at the client device, the dynamic purchase interface including a subset of the inventory units that are available for delivery to the delivery location at a delivery time.

17 Claims, 6 Drawing Sheets

(51) Int. Cl.
*G06Q 10/087* (2023.01)
*G06Q 30/0601* (2023.01)

(58) Field of Classification Search
USPC ...................................... 705/330, 26.1, 27.1
See application file for complete search history.

(56) References Cited

U.S. PATENT DOCUMENTS

| | | | |
|---|---|---|---|
| 10,514,690 B1* | 12/2019 | Siegel | G05D 1/0027 |
| 10,538,190 B1* | 1/2020 | Metellus | B60F 5/02 |
| 10,783,478 B2 | 9/2020 | Studnicka | |
| 10,977,599 B2 | 4/2021 | Yangourazov | |
| 11,157,866 B2* | 10/2021 | Bostick | G06Q 10/08355 |
| 11,738,867 B2* | 8/2023 | Ehasoo | B60L 5/38 |
| | | | 244/17.11 |
| 12,037,117 B2 | 7/2024 | Foggia et al. | |
| 2015/0120094 A1* | 4/2015 | Kimchi | B64U 10/14 |
| | | | 701/3 |
| 2017/0090484 A1 | 3/2017 | Obaidi | |
| 2018/0297607 A1 | 10/2018 | Willis et al. | |
| 2020/0019925 A1 | 1/2020 | Tokhtabaev | |
| 2020/0043108 A1* | 2/2020 | Faigin | B60W 60/00256 |
| 2020/0070717 A1* | 3/2020 | Garden | G09F 21/048 |
| 2020/0082330 A1* | 3/2020 | Lesser | G06Q 10/0832 |
| 2020/0160265 A1 | 5/2020 | Urban | |
| 2020/0167722 A1 | 5/2020 | Goldberg | |
| 2021/0020048 A1 | 1/2021 | Perko | |
| 2021/0229811 A1 | 7/2021 | Martino et al. | |
| 2022/0180419 A1* | 6/2022 | Ferguson | G05D 1/0276 |
| 2022/0198355 A1* | 6/2022 | Menachem | G06Q 30/0284 |
| 2025/0013958 A1 | 1/2025 | Nakanishi et al. | |
| 2025/0061414 A1* | 2/2025 | Horowitz | G06Q 10/08 |

OTHER PUBLICATIONS

Richards, Janelle, "Robots Could Change the Face of Food Delivery", Mar. 10, 2017, nbcnews.com, 6 pages (Year: 2017).*
Eliport Editorial Team, "The Top Ten Autonomous Delivery Solutions of 2018"; Apr. 2, 2018, medium.com. Eliport Blog, 18 pages (Year: 2018).*
Raeder, Emily, "Bringing the Convenience Store to Your Door", Jul. 21, 2021, foodondemand.com, 7 pages. (Year: 2021).*
Faisal, Fazmeena, "A Thorough Look Into the World of On-Demand Delivery Apps", Mar. 2, 21, mindster.com, 22 pages. (Year: 2021).*
"The State of the Autonomous Last-Mile Market in 2023", Nov. 2, 2023, wisesystems.com, 19 pages. (Year: 2023).*
Raeder, Emily, "Bringing the Convenience Store to Your Door", Jul. 21, 2021, foodondemand.com, 7 (Year: 2021).*
"The State of the Autonomous Last-Mile Market in 2023", Nov. 2, 2023, wisesystems.com, 18 pages. (Year: 2023).*

* cited by examiner

DYNAMIC PURCHASE INTERFACE FOR REAL-TIME MIDDLE-MILE PURCHASE AND DELIVERY

TECHNICAL FIELD

The field of the disclosure relates generally to cargo delivery and, more specifically, to middle-mile delivery of cargo using unmanned aerial vehicles (UAVs), based on purchases made using a dynamic purchase interface.

BACKGROUND OF THE INVENTION

Cargo delivery between hubs is frequently facilitated using road-based cargo vehicles, including tractor-trailers or "semi-trucks." These cargo vehicles traverse routes between hubs, such as between manufacturing plants, from a plant to a warehouse, between warehouses, from a warehouse to a wholesaler, and the like, to deliver large cargo loads therebetween. Notably, however, this hub-to-hub delivery paradigm is somewhat limited, in that the cargo vehicles are often traversing large distances between endpoints, during which the cargo is inaccessible.

The last-mile portion of delivery, from a hub to a consumer's home or workplace, is recognized as a significant time and cost sink. In many cases, the last-mile delivery is performed in a direction opposite to the delivery route traversed by the cargo vehicle, or the ultimate delivery location is significantly closer to the delivery route of the cargo vehicle than the hub.

Additionally, on-demand services are increasingly desirable by consumers, including delivery services with rapid delivery times. In particular, consumers often prefer to purchase goods online, or without having to travel to a brick-and-mortar store themselves. These consumers also often prefer delivery options in which goods are delivered directly to them (e.g., to their residence or workplace) and as promptly as possible.

There is a need, therefore, for delivery opportunities during the middle mile, or while the cargo vehicle is traversing its hub-to-hub delivery route, without sacrificing the efficiencies of large-scale cargo delivery. A purchase and delivery system that accommodates such middle-mile deliveries is also needed.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed inventory management system for generating a dynamic purchase interface within an on-demand purchase app installed and executed on a client device communicatively coupled to the inventory management system includes at least one processor communicatively coupled to at least one memory device and at least one communication interface. The at least one processor is programmed to store, for each inventory unit within an automated vehicle, an inventory record, each inventory record respectively including an identifier of the inventory unit, a location of the inventory unit within the automated vehicle, and a status of the inventory unit. The at least one processor is also programmed to monitor a location of the automated vehicle as the automated vehicle travels along a predetermined travel route, and receive, from the client device, a request for generation of the dynamic purchase interface within the on-demand purchase app executed at the client device. The at least one processor is also programmed to, in response to the request, identify a delivery location associated with the client device, and cause display of the dynamic purchase interface within the on-demand purchase app at the client device, the dynamic purchase interface including a subset of the inventory units that are available for delivery to the delivery location at a delivery time.

In another aspect, the disclosed method for generating a dynamic purchase interface within an on-demand purchase app installed and executed on a client device communicatively coupled to an inventory management system is implemented by the inventory management system. The inventory management system includes at least one processor communicatively coupled to at least one memory device and at least one communication interface. The method includes storing, for each inventory unit within an automated vehicle, an inventory record, each inventory record respectively including an identifier of the inventory unit, a location of the inventory unit within the automated vehicle, and a status of the inventory unit, and monitoring a location of the automated vehicle as the automated vehicle travels along a predetermined travel route. The method also includes receiving, from the client device, a request for generation of the dynamic purchase interface within the on-demand purchase app executed at the client device, and, in response to the request, identifying a delivery location associated with the client device. The method further includes causing display of the dynamic purchase interface within the on-demand purchase app at the client device, the dynamic purchase interface including a subset of the inventory units that are available for delivery to the delivery location at a delivery time.

In yet another aspect, the disclosed on-demand delivery system includes an unmanned aerial vehicle (UAV) associated with an automated vehicle traveling along a predetermined travel route and an inventory management system for generating a dynamic purchase interface within an on-demand purchase app installed and executed on a client device communicatively coupled to the inventory management system. The inventory management system is configured to store, for each inventory unit within the automated vehicle, an inventory record, each inventory record respectively including an identifier of the inventory unit, a location of the inventory unit within the automated vehicle, and a status of the inventory unit. The inventory management system is also configured to monitor a location of the automated vehicle as the automated vehicle travels along the predetermined travel route, receive, from the client device, a request for generation of the dynamic purchase interface within the on-demand purchase app executed at the client device, and, in response to the request, identify a delivery location associated with the client device. The inventory management system is further configured to cause display of the dynamic purchase interface within the on-demand purchase app at the client device, the dynamic purchase interface including a subset of the inventory units that are available for delivery to the delivery location at a delivery time. The inventory management system is still further configured to receive, from the client device, an order message including a purchased unit identifier of a purchased inventory unit from the subset of inventory units, the delivery location, and the delivery time, and transmit a control signal to the UAV to initiate retrieval of the purchased inventory unit from the automated vehicle traveling along the travel route and delivery of the purchased inventory unit to the delivery location at the delivery time.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

Embodiments of the disclosed delivery system are directed to middle-mile cargo delivery using unmanned aerials vehicles (UAVs). The use of the phrase "middle mile," with respect to the present disclosure, refers to the location of cargo somewhere between an initial pick-up location and an ultimate delivery location. In particular, the cargo represents inventory within a cargo vehicle, such as a tractor-trailer. The cargo vehicle is responsible for picking up a predetermined large amount of cargo for delivery along a delivery route between hubs, such as between manufacturing plants, from a plant to a warehouse, between warehouses, from a warehouse to a wholesaler, and the like. The cargo within the cargo vehicle is in its "middle mile" location while the cargo vehicle is traversing its delivery route—that is, while the cargo vehicle is in motion. Accordingly, with respect to the present disclosure, UAVs are controlled to pick up cargo from the in-motion cargo vehicle, for delivery to locations other than the hubs of the delivery vehicle, such as to the homes or workplaces of individual consumers.

In the example embodiment, the delivery system of the present disclosure is implemented with respect to an autonomous cargo vehicle. The autonomous cargo vehicle is controlled by an autonomy computing system, as described in greater detail herein. In particular, the autonomous cargo vehicle is controlled to operate at high speeds, including such speeds as greater than 40 miles per hour (MPH), 50 MPH, 60 MPH, or 65 MPH, referred to generally herein as highway speeds. It should be understood that the autonomous cargo vehicle is frequently traveling at various speeds, including highway speeds as well as non-highway speeds, and the present disclosure is not limited thereby.

In at least some embodiments, the delivery system of the present disclosure functions substantially independently of the autonomy control system. That is, although the delivery system may communicate with the autonomy control system, such as to receive data therefrom or transmit data thereto, the delivery system, in many embodiments, does not affect the functionality of the autonomy computing system to operate the autonomous cargo vehicle according to predetermined conditions.

In particular, the UAVs—also referred to as drones—are controlled to pick up units of cargo from the autonomous cargo vehicle, while the autonomous cargo vehicle is in motion, including at highway speeds. The delivery system of the present disclosure includes a UAV control system, which is configured to control the operation of one or more UAVs, as described in greater detail herein, to pick-up one or more units of cargo and deliver the unit(s) to an ultimate delivery location (other than a hub delivery location of the cargo vehicle). The UAV control system includes hardware computing and communication components as well as a software ecosystem implemented on-board the cargo vehicle, on-board the UAV(s), remotely from the cargo vehicle or UAV(s) (e.g., as a cloud-based server implementation), or in a distributed manner therebetween.

This delivery system is enabled, in part, using an inventory management system (IMS). The IMS includes the hardware components implemented within the cargo vehicle to maneuver cargo, referred to broadly as inventory handlers. Inventory handlers may include, without limitation, conveyors or similar track-based movement systems, robotic arms, lifts, gantries, rollers, and the like. The IMS also includes any stationary cargo storage components, such as cases (e.g., pallets, boxes, cartons) and shelving. The IMS further includes cargo tracking components, including scanners, for tracking the location and position of cargo within the cargo vehicle. In addition, the IMS includes hardware computing and communication components as well as a software ecosystem that may be implemented on-board the cargo vehicle, remotely from the cargo vehicle (e.g., as a cloud-based server implementation), or in a distributed manner therebetween. The software ecosystem facilitates control of the hardware components of the IMS, as described in further detail herein, as well as various communication functions between other systems and devices, such as the autonomy computing system of the cargo vehicle, a UAV control system, remote (client) devices, and the like.

In addition, the IMS is configured to track inventory availability on-board the cargo vehicle and to interface with the autonomy computing system to identify and track a route traveled by the cargo vehicle. The IMS determines inventory availability in addition to location and timing limitations on that availability. For instance, the IMS determines which unit(s) of inventory can be delivered to locations within a delivery radius or geofence that is calculated based in part on the route of the cargo vehicle and the capabilities of the UAV(s) servicing the cargo vehicle. The IMS is further configured to monitor and manage inventory across two or more cargo vehicles (generally, a fleet of cargo vehicles). Moreover, the IMS is configured to maintain a user-facing dynamic purchase interface that presents available inventory to consumers based on the above-described availability calculations and determinations. In this way, the delivery system of the present disclosure may be referred to as an on-demand delivery system.

Figure 1:
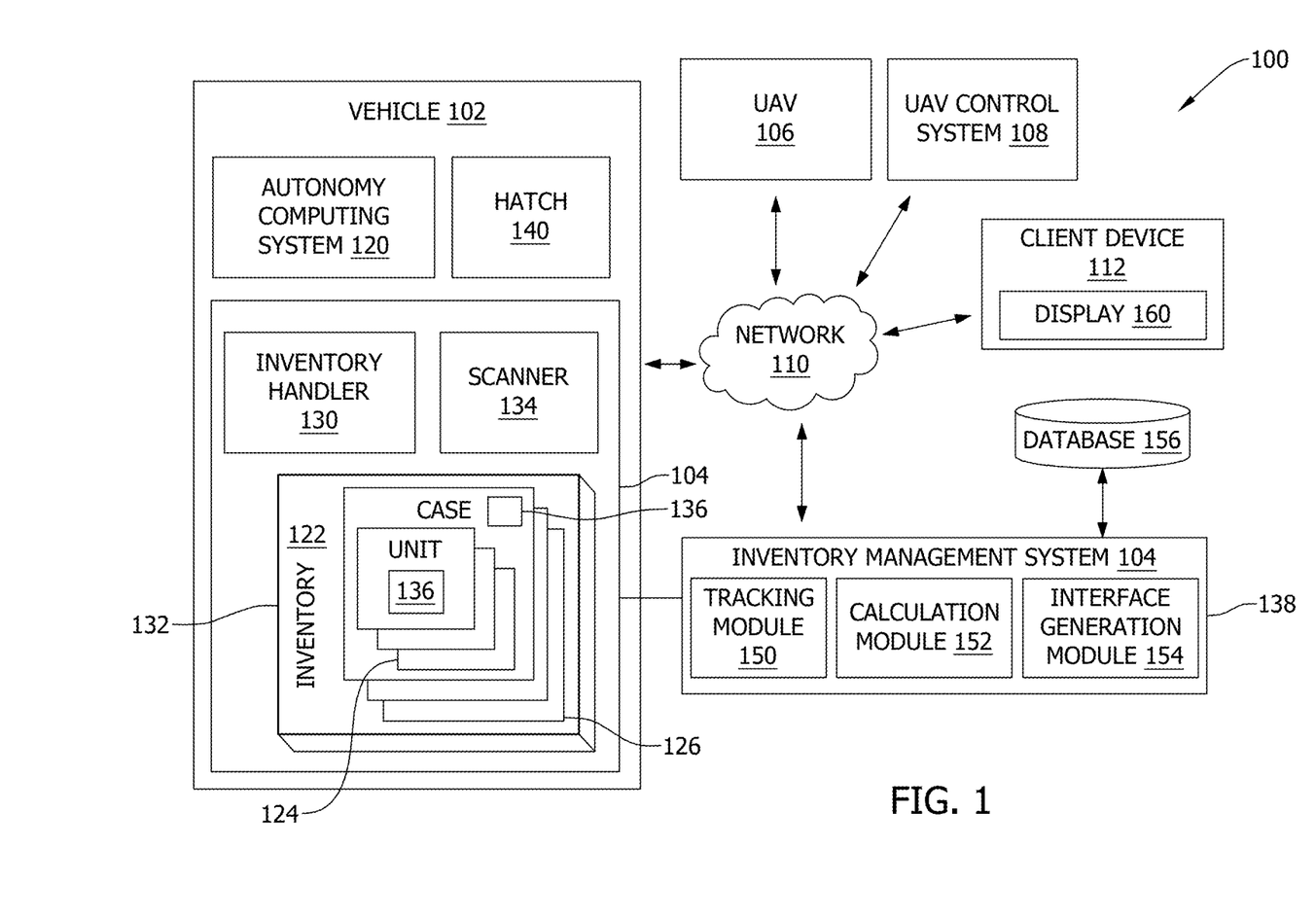
FIG. 1 is a block diagram of an embodiment of a delivery system.

FIG. 1 is a block diagram depicting an example embodiment of a delivery system 100. Delivery system 100 includes an automated cargo vehicle (ACV) 102. Delivery system 100 also includes an IMS 104, one or more UAVs 106, and a UAV control system 108. ACV 102, IMS 104, UAV 106, and UAV control system 108 are communicatively connected via a network 110. One or more remote client devices 112 (e.g., smart phone, laptop, desktop, tablet, etc.) also communicate with one or more components of delivery system 100, specifically IMS 104, via network 110.

ACV 102 includes a vehicle autonomy computing system 120 that controls operation of ACV 102. Additionally, ACV 102 houses cargo 122 being delivered between hubs according to a delivery route. Cargo 122 is also referred to herein as inventory 122. In the example embodiment, inventory 122 includes a plurality of units 124 housed in a plurality of cases 126. Units 124 and cases 126 can be any suitable inventory. In some embodiments, cases 126 are stacked upon one another or otherwise stored in a complementary fashion. Units 124 are arranged within cases 126, and may be stacked upon one another, arranged in a single layer, arranged randomly (e.g., as a pile), or otherwise. In some particular embodiments, units 124 or cases 126 include complementary engagement features such that units 124 or cases 126 exhibit relatively high lateral and longitudinal stability. In such cases, units 124 or cases 126 are prevented from substantial lateral and longitudinal movement. In at least some of these embodiments, units 124 or cases 126 are otherwise relatively easy to lift, or are not prevented from relative vertical motion. Thereby, units 124 or cases 126 may be maneuvered, in part, using lifting components. In some embodiments, inventory 122 includes similar cases 126 and units 124. That is, ACV 102 may be delivering (to a hub) a single type of inventory. In other embodiments, ACV 102 includes a plurality of different types of inventory, such that cases 126 and units 124 vary.

IMS 104 is at least partially retained in ACV 102. Specifically, at least the hardware components used for storing, moving, and tracking inventory 122 within ACV 102 is housed in ACV 102. IMS 104 includes at least one inventory handler 130 in ACV 102. Inventory handler 130 includes any component(s) configured to move and position inventory 122 within or relative to ACV 102, such as lift(s), robotic arm(s), conveyor(s), and the like. IMS 104 also includes storage component(s) 132, including any stationary components configured to retain inventory 122 in a predefined storage position (e.g., shelves, racks, or rails).

IMS 104 also includes a scanner 134. Scanner 134 may include any scanning component(s) configured to track the placement and movement of inventory 122 within ACV 102. In particular, units 124 and cases 126 each include respective computer-readable identifiers 136, which are uniquely associated with that particular unit 124 or case 126 and are readable using scanner 134. Computer-readable identifiers 136 may include, for example, RFID tags, such that scanner 134 may read identifiers 136 without particular concern to moderate movement of unit 124 or case 126 (e.g., if there is a bump in the road, or the unit 124 is being buffeted by wind). Likewise, scanner 134 includes one or more RFID scanners positioned in strategic locations throughout ACV 102. Additionally or alternatively, identifiers 136 include barcodes, QR codes, or other suitable computer-readable identifiers. Therefore, scanner 134 may additionally or alternatively include barcode scanner(s), QR code scanner(s), cameras, optical scanners, or any other suitable scanning device for object tracking (e.g., localization, identification), including scanner(s) trained with image processing techniques to recognize objects (such as units 124, cases 136) based on physical properties thereof (such as shape, color, size, etc.). In some embodiments, one or more of inventory handlers 130 include a scanner 134 coupled thereto. In this way, the location and movement of unit(s) 124 of inventory 122 can be precisely tracked during middle-mile processing within ACV 102.

In the example embodiment, IMS 104 is implemented in a distributed fashion, in which some components and control functions are local to ACV 102 and a remote environment 138 of IMS 104 is remote from ACV 102. That is, data management and processing is primarily performed remotely from ACV 102, such as in a cloud computing environment at a remote server. IMS 104 is configured to host an on-demand purchase application (app), instances of which are stored and executed on external devices, such as client devices 112, to access information related to inventory 122 and purchase units 124 of inventory to be delivered via UAV 106. Remote environment 138 includes any suitable cloud-based app hosting infrastructure, enabling IMS 104 to host the on-demand purchase app and communicate with remote client devices 112 (e.g., via an API connection) to display the app as a series of user interfaces on a display 160 of client device 112. It should be readily understood that the functionality described herein relative to the on-demand purchase app may be implemented as web pages on a web browser, and such functionality is not limited to a software app but may be extended to web browsers or other access channels.

IMS 104 includes, in the example embodiment, a tracking module 150, a calculation module 152, and an interface generation module 154, as described in greater detail herein. Modules 150, 152, 154 may be implemented as dedicated specialized processing units or as executable instructions that are read and executed by one or more same processing unit(s) and that configure the processing unit(s) as a special-purpose processing unit(s).

ACV 102 also includes one or more hatches 140. Hatch 140 is an entry/exit point of ACV 102 through which unit(s) 124 of inventory 122 can be placed/removed. In the example embodiment, ACV 102 includes at least one hatch 140 on a roof or top wall of a trailer thereof. Hatch 140 includes one or more panels (not shown) that open in response to a control command from IMS 104 or autonomy computing system 120. Scanner 134 may be located adjacent to each hatch 140, such that unit(s) can be scanned before or during retrieval by UAV 106. ACV 102 may additionally or alternatively include at least one hatch 140 on one or more side wall(s) of the trailer. As described herein, UAV 106 is controlled to approach hatch 140 to retrieve unit(s) 124 from ACV 102. Reference herein to hatch 140 should not be construed in a limited manner. That is, ACV 102 may include multiple hatches 140, and UAVs 106 may retrieve unit(s) 124 via any one of hatch(es) 140 without limitation.

Delivery system 100 includes at least one UAV 106 and, in many embodiments, a plurality of UAVs 106. One UAV 106 may be associated with or operable to delivery inventory 122 from one ACV 102 or multiple ACVs 102. Likewise, an ACV 102 may be serviced by one UAV 106 or multiple UAVs 106. UAV 106 includes any drone or other aerial vehicle suitable to perform the functions described herein, including retrieving unit(s) 124 of inventory 122 and delivering such unit(s) 124 to a delivery location. Accordingly, although not shown in FIG. 1, UAV 106 includes one or more movement components (e.g., propellers) enabling UAV 106 to move in a controlled manner, one or more communication components enabling control of UAV 106 by UAV control system 108, and one or more engagement components enabling UAV 106 to engage unit(s) 124 of inventory 122. The engagement components may include, for example and without limitation, hooks, cords, chains, magnets, claws, lifters, nets, pulleys, winches, and the like.

UAV control system 108 is configured to control the movement and operation of UAV 106, as described further herein, and includes any suitable processing, memory, and communication hardware suitable to perform these functions. In the example embodiment, UAV control system 108 is at least partially implemented onboard UAV 106, such that control of UAV 106 (e.g., docking, unit retrieval, stabilization, obstacle avoidance, etc.) is substantially or completely local to UAV 106. In other embodiments, some aspects of UAV control is primarily performed remotely from UAV 106 (e.g., route planning).

In operation, a consumer (not shown) operates a client device 112 to submit an order for one or more units 124 of inventory 122 that is retained within ACV 102, which is in motion along a cargo delivery route between hubs. In the example embodiment, the consumer is located in some delivery location between the hubs. In particular, the consumer operates their client device 112 to execute the on-demand purchase app, which is executed and displayed on display 160 of their client device 112. The consumer interacts with IMS 104 via the on-demand purchase app to view inventory units 124 that are available to purchase in real-time.

IMS 104 executes tracking module 150 to track inventory 122 on-board ACV 102 and, in some embodiments, on other ACVs 102 within a fleet of ACVs 102 (not specifically shown). Tracking module 150 maintains a database 156 or ledger of units 124 and cases 126 on-board ACV 102 and their status. Each unit 124/case 126 has a record associated therewith, which includes an identifier of the unit 124/case 126 (e.g., corresponding to the identifier 136) and a status of the unit 124/case 126. When inventory 122 is initially loaded onto ACV 102 as cargo, units 124/cases 126 may have an initial status as "in transit," or some other default status, to its ultimate destination as cargo—that is, the delivery hub of ACV 102. Where certain units 124 or cases 126 have already been purchased by consumers, as described further herein, tracking module 150 updates the relevant records for those units 124/cases 126, identifying their status as "purchased" or otherwise accounted for. The records for units 124/cases 126 may include other data elements, such as a last-scanned location of the unit 124/case 126 within ACV 102. In some embodiments, tracking module 150 maintains these records for inventory 122 across a fleet of ACVs 102. In such cases, the records for inventory 122 further include an identifier of which ACV 102 the inventory 122 is located within.

IMS 104 executes calculation module 152 to determine which units 124/cases 136 are available for middle-mile purchase and delivery, according to timing and location limitations, as well as delivery capabilities of UAV 106. Calculation module 152 stores or accesses input parameters such as vehicle travel parameters (e.g., heading, speed, location, route, date, time) of ACV 102, UAV capability parameters (e.g., speed, capacity, location) of UAVs 106 servicing ACV 102, and inventory availability parameters. Output from calculation module 152 includes, for example, an initial or preliminary availability status of units 124. Specifically, in some embodiments, calculation module 152 computes or otherwise determines a rolling geofence surrounding ACV 102 along the predetermined travel route of ACV 102. Units 124 on-board ACV 102 that have an "available" status (e.g., as assigned in a respective inventory record in database 156) are initially determined to be available for purchase at locations within the rolling geofence.

IMS 104 executes interface generation module 154 to populate a dynamic purchase interface for display at client device 112. As described herein, the purchase interface includes various features or filters, such as delivery location, type of inventory, delivery timing/date, that enable a user of client device 112 to change, refine, and update their request to access inventory units 1254 that are available for purchase and delivery from ACV(s) 102.

In some embodiments, IMS 104 executes interface generation module 154 to format the initial availability information, from calculation module 152, into a format suitable for delivery to client device 112 (e.g., over an API connection) and display at client device 112 within the dynamic purchase interface. Interface generation module 154 causes display of the dynamic purchase interface at client device 112 and populates the dynamic purchase interface with available units 124 based on the preliminary availability status.

In some embodiments, interface generation module 154 receives information from client device 112 indicating a device location of client device 112. For instance, IMS 104 receives a request from client device 112 to generate the purchase interface (e.g., upon execution of the on-demand purchase app on client device), and the request includes device location data captured at client device 112 at the time the request is made. The device location data may include, for example, GPS data generated and captured at client device 112. Interface generation module 154 may feed the device location to calculation module 152, and calculation module 152 may determine availability of inventory 122 relative to the device location. For instance, calculation module 152 compares the rolling geofence around one or more ACVs 102 to the device location, and indicates as available those units 124 that are within delivery distance of the device location at the time the request is received. It should be understood that determination of availability can be performed in many ways, and the present disclosure is not limited to one calculation or computation method.

Interface generation module 154 is configured to re-populate the purchase interface continuously and in real-time in response to changing inputs. Changing inputs may include, for example, changing output from calculation module 152, based on the changing location of the ACV 102 along the travel route and, if applicable, a changing location of client device 112; changing user inputs at the purchase interface (e.g., a newly selected location, newly selected delivery time, newly selected type of time, etc.).

As described herein, the modules 150, 152, 154 interact with each other in real-time to receive user inputs, recalculate availability outputs, and re-populate or re-execute the dynamic purchase interface. Additionally, any module 150, 152, 154 may access database 156 to retrieve information therefrom and/or write information thereto.

In the example embodiment, IMS 104 receives an order message from client device 112 (e.g., via network 110), based on an order submitted through the dynamic purchase interface. The order message includes, among other data, an identification of the one or more units 124 the consumer has ordered, as well as a delivery location and requested delivery time. In some embodiments, IMS 104 does not make available units 124 that cannot be delivered to a specified location at a specific time, or does not accept orders that cannot be fulfilled. IMS 104 may communicate with the consumer via the on-demand purchase app that an in-process order cannot be submitted or fulfilled. IMS 104 may be configured to propose an alternative delivery location or delivery time that would enable the order to be fulfilled. Additionally or alternatively, IMS 104 may be configured to propose alternative units(s) 124 that are or will be available from a different ACV 102.

If the order can be fulfilled using inventory 122, IMS 104 calculates a pick-up time at which a UAV 106 is able to retrieve the ordered and identified unit(s) 124. In the example embodiment, IMS 104 interfaces with autonomy computing system 120 (e.g., via network 110) to retrieve information about the planned travel route that the ACV 102 is traversing or will be traversing. This information includes, for example, speed, heading, location, and planned trajectory details of the travel route. IMS 104 uses this route information, as well as information related to the ultimate (client) delivery location and the capabilities and location of UAV 106, to calculate the pick-up time at which UAV 106 will pick up unit(s) 124.

IMS 104 controls the onboard components of IMS 104 to position unit(s) 124 in a retrieval location for retrieval of the unit(s) 124 by UAV 106 at the pick-up time. More specifically, IMS 104 determines an initial (storage) position of unit(s) 124 within ACV 102, such as where unit(s) 124 were last located by scanner 134. IMS 104 identifies a retrieval route between the initial position of unit(s) 124 and a retrieval position of unit(s) 124, such as adjacent to hatch 140 of ACV 102. IMS 104 calculates the duration of the retrieval route and determines, based on this calculation, corresponding operations of inventory handler(s) 130 to position unit(s) 124 in the retrieval position at or before the pick-up time. IMS 104 controls inventory handler(s) 130 according to this operation. Scanners 134 scan the identifier(s) 136 of unit(s) 124 one or more times and at one or more locations as unit(s) 124 are moved along the retrieval route. IMS 104 is also configured to control operation of hatch 140 to open when unit(s) 124 are in the retrieval position or when UAV 106 is in its pick-up position to retrieve unit(s) 124.

IMS 104 also transmits a retrieval signal to UAV control system 108. The retrieval signal includes the pick-up time, as well as at least some of the route information of ACV 102. UAV control system 108 parses the retrieval signal and determines, based thereon, a pick-up operation for UAV 106. For example, UAV control system 108 uses the speed, heading, and location information of ACV 102, the pick-up time, and stored data related to the capabilities of UAV 106 to determine when and how UAV 106 is to approach ACV 102 and engage ACV 102 or unit(s) 124 during pick-up. UAV control system 108 is configured to control the speed, heading, location, and position of UAV 106 according to the pick-up operation. As such, UAV control system 108 controls UAV 106 to maneuver into a pick-up or retrieval position, relative to ACV 102 and hatch 140, at the pick-up time.

In some embodiments, UAV 106 is initially coupled to or co-located with ACV 102. For instance, ACV 102 may be "equipped" with one or more UAVs 106 that are stationed on or in ACV 102 until a middle-mile delivery is initiated. In other embodiments, UAV 106 is elsewhere, such as at a UAV hub location (not shown) or performing another delivery operation when a new middle-mile delivery is initiated. Accordingly, in some instance, control of UAV 106 may include a start-up operation. Control may also include, for example, controlling UAV 106 to "hover" above hatch 140 while UAV 106 is travelling at a same speed as ACV 102, or controlling UAV 106 to land on ACV 102 in a position relative to hatch 140 while ACV 102 is in motion.

UAV control system 108 also controls operation of the engagement components of UAV 106 to engage the unit(s) 124 for pick-up. The engagement components may engage the unit 124 outside of a body of UAV 106 and may draw the unit 124 within the body of UAV 106 before UAV 106 departs from ACV 102. Alternatively, UAV 106 may maintain the unit 124 outside of the body of UAV 106 during pick-up and delivery of unit 124.

UAV control system 108 also determines a delivery route for UAV 106 to deliver unit(s) 124 to the location of the consumer (delivery location), and controls UAV 106 to traverse the delivery route.

In some embodiments, IMS 104 may perform one or more of the above-described determinations or calculations related to control of UAV 106, and may transmit corresponding output to UAV control system 108 for control of UAV 106.

The above operations for middle-mile inventory purchase and order fulfillment can be performed more than once, concurrently or sequentially, in response to a queue of orders from multiple client devices 112. IMS 104 is configured to determine the sequence in which orders are fulfilled and controls inventory handler(s) 130 accordingly. IMS 104 is further configured to perform any determinations or calculations to limit or restrict orders, such as determining whether ACV 102 includes suitable inventory 122, whether ACV 102 is travelling a route that enables a UAV 106 to pick-up and deliver ordered unit(s) 124, whether inventory 122 is suitably arranged within ACV 102 to enable delivery within a prescribed time period, whether the order was submitted in time, etc.

Additionally, in some embodiments, IMS 104 and UAV control system 108 are configured to enable operation of UAV 106 within ACV 102 to perform inventory movement or pick-up operations.

Figure 2:
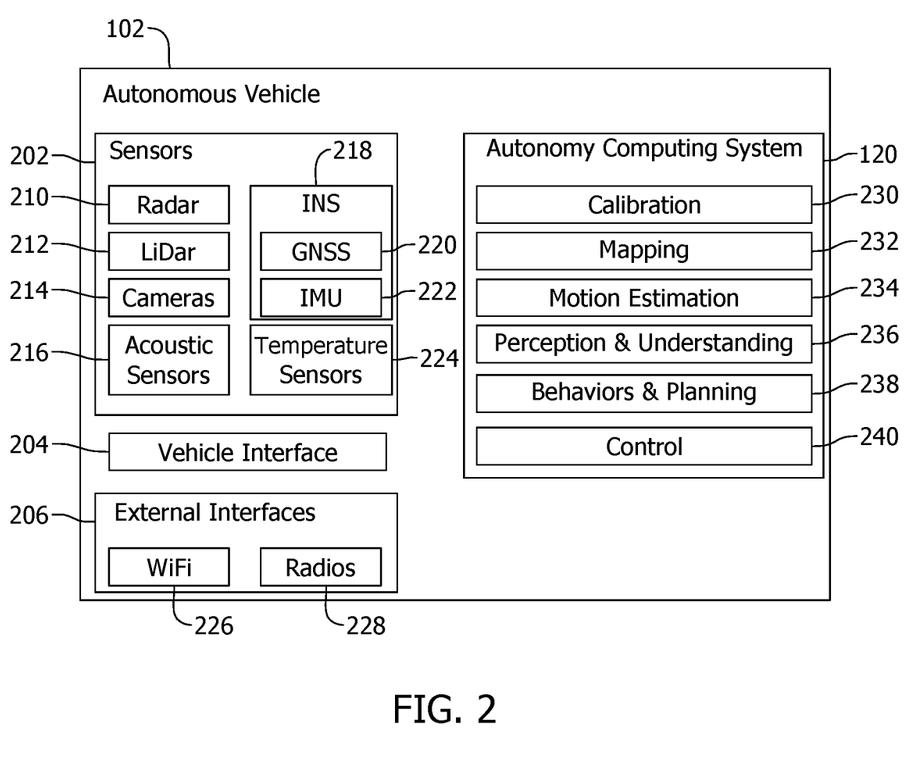
FIG. 2 is a block diagram of an embodiment of an autonomous cargo vehicle that may be used in conjunction with the delivery system shown in FIG. 1.

FIG. 2 is a block diagram of one embodiment of ACV 102. In the example embodiment, ACV 102 includes autonomy computing system 120, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 224, or inertial navigation system (INS) 218, which may include one or more global navigation satellite system (GNSS) receivers 220 and one or more inertial measurement units (IMU) 222. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of ACV 102 and its proximity. As described in further detail below, these signals may be used by autonomy computing system 120 to determine how to control operation of ACV 102. These signals, whether raw or processed by autonomy computing system 120, may additionally be used by IMS 104 (shown in FIG. 1) to manage middle-mile delivery requests or by UAV control system 108 to determine how to control UAV 106 to perform pick-up operations.

Cameras 214 are configured to capture images of the environment surrounding ACV 102 in any aspect or field of view (FOV). The FOV can have any angle or aspect such that images of the areas ahead of, to the side, behind, above, or below ACV 102 may be captured. In some embodiments, the FOV may be limited to particular areas around ACV 102 (e.g., forward of ACV 102, to the sides of ACV 102, etc.) or may surround 360 degrees of ACV 102. In some embodiments, ACV 102 includes multiple cameras 214, and the images from each of the multiple cameras 214 may be stitched or combined to generate a visual representation of the multiple cameras' FOVs, which may be used to, for example, generate a bird's eye view of the environment surrounding ACV 102. In some embodiments, the image data generated by cameras 214 may be sent to autonomy computing system 120 or other aspects of ACV 102, and this image data may include ACV 102 or a generated representation of ACV 102. In some embodiments, one or more systems or components of autonomy computing system 120 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below ACV 102 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around ACV 102.

GNSS receiver 220 is positioned on ACV 102 and may be configured to determine a location of ACV 102, which it may embody as GNSS data, as described herein. GNSS receiver 220 may be configured to receive one or more signals from a global navigation satellite system (e.g., Global Positioning System (GPS) constellation) to localize ACV 102 via geolocation. In some embodiments, GNSS receiver 220 may provide an input to or be configured to interact with, update, or otherwise utilize one or more digital maps, such as an HD map (e.g., in a raster layer or other semantic map). In some embodiments, GNSS receiver 220 may provide direct velocity measurement via inspection of the Doppler effect on the signal carrier wave. Multiple GNSS receivers 220 may also provide direct measurements of the orientation of ACV 102. For example, with two GNSS receivers 220, two attitude angles (e.g., roll and yaw) may be measured or determined. In some embodiments, ACV 102 is configured to receive updates from an external network (e.g., a cellular network). The updates may include one or more of position data (e.g., serving as an alternative or supplement to GNSS data), speed/direction data, orientation or attitude data, traffic data, weather data, or other types of data about ACV 102 and its environment.

IMU 222 is a micro-electrical-mechanical (MEMS) device that measures and reports one or more features regarding the motion of ACV 102, although other implementations are contemplated, such as mechanical, fiber-optic gyro (FOG), or FOG-on-chip (SiFOG) devices. IMU 222 may measure an acceleration, angular rate, and or an orientation of ACV 102 or one or more of its individual components using a combination of accelerometers, gyroscopes, or magnetometers. IMU 222 may detect linear acceleration using one or more accelerometers and rotational rate using one or more gyroscopes and attitude information from one or more magnetometers. In some embodiments, IMU 222 may be communicatively coupled to one or more other systems, for example, GNSS receiver 220 and may provide input to and receive output from GNSS receiver 220 such that autonomy computing system 120 is able to determine the motive characteristics (acceleration, speed/direction, orientation/attitude, etc.) of ACV 102.

In the example embodiment, autonomy computing system 120 employs vehicle interface 204 to send commands to the various aspects of ACV 102 that actually control the motion of ACV 102 (e.g., engine, throttle, steering wheel, brakes, etc.) and to receive input data from one or more sensors 202 (e.g., internal sensors). External interfaces 206 are configured to enable ACV 102 to communicate with an external network (e.g., network 110, shown in FIG. 1) via, for example, a wired or wireless connection, such as WiFi 226 or other radios 228. In embodiments including a wireless connection, the connection may be a wireless communication signal (e.g., Wi-Fi, cellular, LTE, 5g, Bluetooth, etc.). In some embodiments, ACV 102 employs external interfaces 206 to communicate information about the operation of ACV 102 to IMS 104 or UAV control system 108.

In some embodiments, external interfaces 206 may be configured to communicate with an external network via a wired connection, such as, for example, during testing of ACV 102 or when downloading mission data after completion of a trip. The connection(s) may be used to download and install various lines of code in the form of digital files (e.g., HD maps), executable programs (e.g., navigation programs), and other computer-readable code that may be used by ACV 102 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, ACV 102 may deploy with all of the data it needs to complete a mission (e.g., perception, localization, and mission planning) and may not utilize a wireless connection or other connection while underway.

In the example embodiment, autonomy computing system 120 is implemented by one or more processors and memory devices of ACV 102. Autonomy computing system 120 includes modules, which may be hardware components (e.g., processors or other circuits) or software components (e.g., computer applications or processes executable by autonomy computing system 120), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, and a control module or controller 240. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard ACV 102.

Autonomy computing system 120 of ACV 102 may be completely autonomous (fully autonomous) or semi-autonomous. In one example, autonomy computing system 120 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

While this disclosure refers to ACV 102 as an autonomous (cargo) vehicle, it is understood that ACV 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 3:
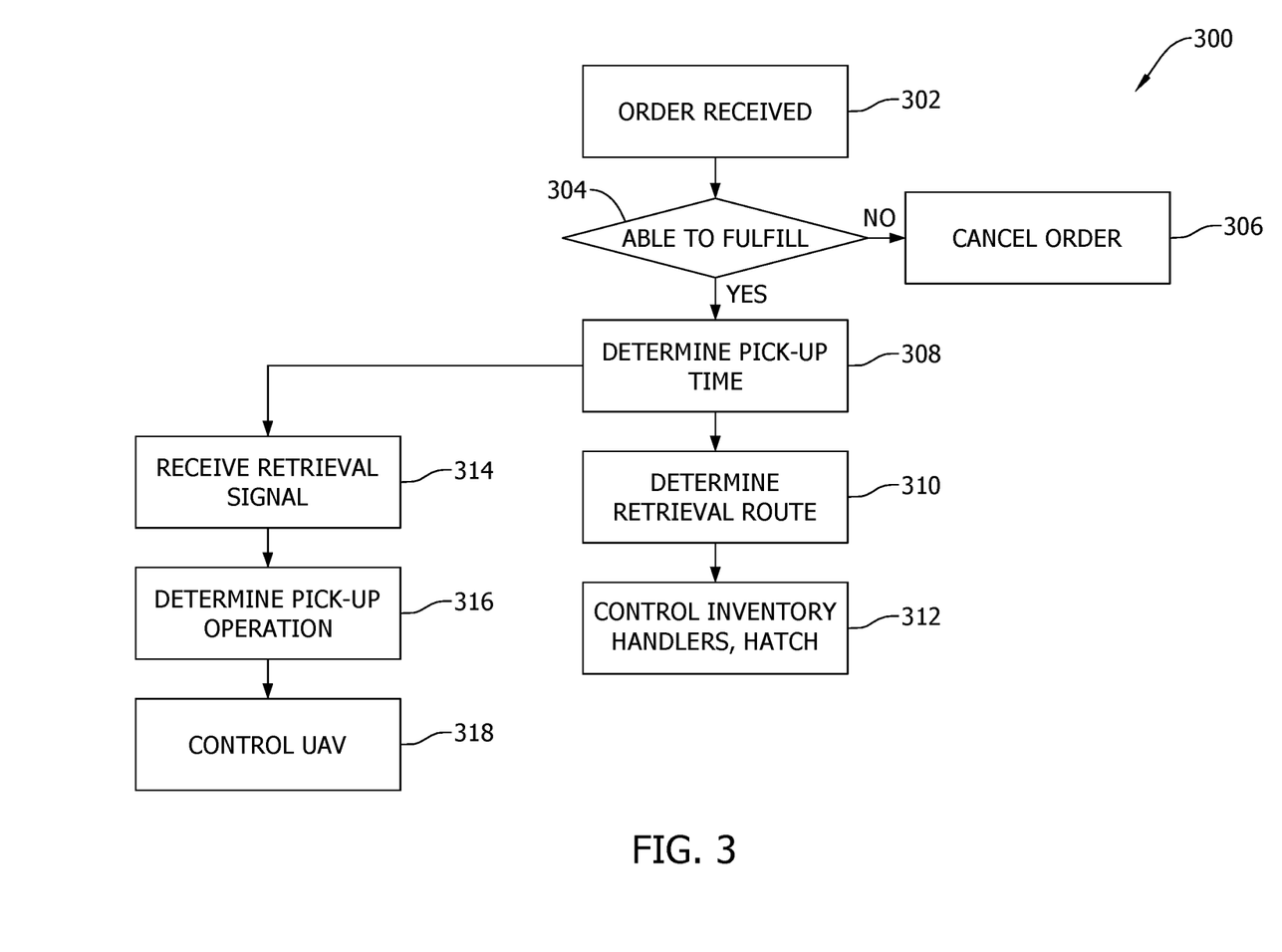
FIG. 3 is a flow diagram of a method of middle-mile delivery using unmanned aerial vehicles (UAVs), using the delivery system shown in FIG. 1.

FIG. 3 is a flow diagram of a method 300 of middle-mile delivery using UAVs (e.g., UAVs 106), using delivery system 100 (shown in FIG. 1). At least some of the steps of method 300 are performed by IMS 104. In some embodiments, some steps of method 300 are performed by UAV control system 108.

IMS 104 receives 302 an order (e.g., from a client device 112) for one or more units 124 of inventory 122. IMS 104 determines 304 whether the order can be fulfilled or not. For example, IMS 104 determines whether ACV 102 contains inventory 122 suitable to fulfill the order and whether ACV 102 is traversing a delivery route that enables middle-mile delivery by UAV 106. If the order cannot be fulfilled, IMS 104 cancels 306 the order.

If the order can be fulfilled, IMS 104 determines 308 a pick-up time at which UAV 106 can pick-up the ordered unit(s) 124 for delivery. This pick-up time may be determined 308 as an absolute latest time, as a threshold duration of time, as a preferred time, or in any other manner. IMS 104 determines 310 a retrieval route for the ordered unit(s) 124 from their current position within ACV 102 to a retrieval position (at which unit(s) 124 can be retrieved by UAV 106) and, subsequently, controls 312 inventory handler(s) 130 to perform operations to maneuver the unit(s) 124 along the retrieval route and into the retrieval position. IMS 104 also controls 312 hatch 140 to open at an appropriate time (e.g., when the unit(s) 124 are in the retrieval position or when UAV 106 is in its pick-up position to retrieve the unit(s) 124). In some embodiments, IMS 104 controls 312 various components thereof (e.g., inventory handler(s) 130) to operate such that unit(s) 124 are positioned in the retrieval position at substantially the same time UAV 106 is in its pick-up position. IMS 104 may control 312 those components to position unit(s) 124 within a threshold period of time before or after UAV 106 is in its pick-up position, such as within a minute before or within a minute after.

Additionally, IMS 104 initiates operations to control UAV 106. In some embodiments, IMS 104 transmits a retrieval signal including the pick-up time to UAV control system 108. UAV control system 108 receives 314 the retrieval signal and, based thereon, determines 316 a pick-up operation for UAV 106. The pick-up operation includes the various operations to be performed by UAV 106 to position UAV 106 in its pick-up position, to engage the unit(s) 124, and to lift off or otherwise depart from ACV 102. UAV control system 108 controls 318 UAV 106 to perform the pick-up operations according to determination 316.

Figure 4:
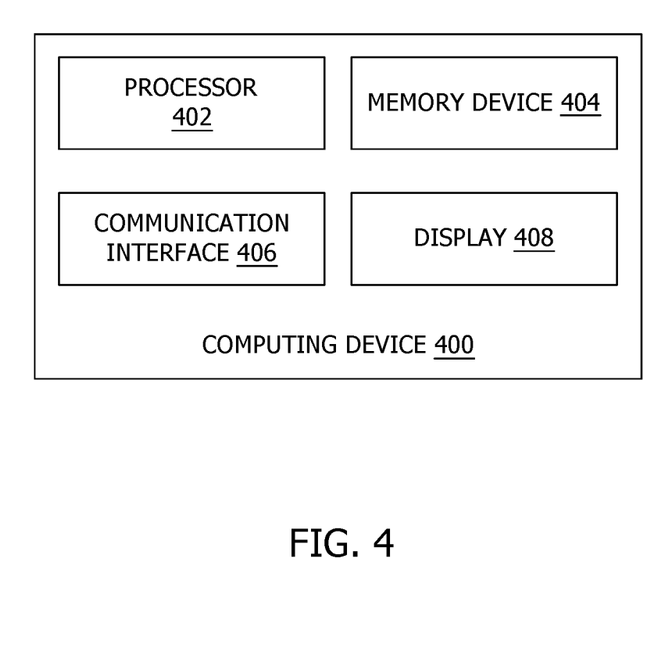
FIG. 4 is a schematic diagram of a computing device that may be used in the delivery system shown in FIG. 1.

Methods and processes described herein may be implemented on autonomy computing system 120, IMS 104, or UAV control system 108. Autonomy computing system 120, IMS 104, UAV control system 108, or client device 112, as described herein, may be any suitable computing device and software implemented therein. FIG. 4 is a block diagram of an example computing device 400.

Computing device 400 includes a processor 402 for executing instructions and a memory device 404. Computing device 400, in the example embodiment, may also include a communication interface 406 that is operatively coupled to processor 402 such that computing device 400 is capable of communicating with a remote device (e.g., client device 112) or another computing device 400, for example.

In the example embodiment, processor 402 may be programmed by encoding an operation using one or more executable instructions and providing the executable instructions in memory device 404. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor." Additionally, processor 402 may include one or more processing units (e.g., in a multi-core configuration).

In the example embodiment, memory device 404 includes one or more devices that enable information, such as executable instructions and/or other data, to be stored and retrieved. Moreover, memory device 404 includes one or more computer readable media, such as, without limitation, dynamic random-access memory (DRAM), static random-access memory (SRAM), a solid-state disk, or a hard disk. In the example embodiment, memory device 404 stores, without limitation, application source code, application object code, configuration data, input data, output data, autonomous control data, inventory management data, UAV capability data, or any other type of data. In some embodiments, memory device 404 is at least partially external to computing device 400 and may be accessed by a plurality of computing device 400. For example, memory device 404 may include multiple storage units such as hard disks or solid-state disks in a redundant array of independent disks (RAID) configuration. In some embodiments, memory device 404 may include a storage area network (SAN) or a network attached storage (NAS) system.

In operation, computing device 400 executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

As shown in FIGS. 1 and 4, computing devices 400 may further include a display 408, such as display 160 of client device 112. In the example embodiment, display 408 is configured as a media output component for presenting information to a user, and may include any suitable display device (e.g., a liquid crystal display (LCD), organic light emitting diode (OLED) display, cathode ray tube (CRT), or "electronic ink" display) or an audio output device (e.g., a speaker or headphones). Display 160 may also function as an input device for receiving input from a user. In some embodiments, display 160 is a single component, such as a touch screen, that functions as both the input and output device of computing device 400. In other embodiments, computing device 400 includes one or more additional input devices, such as, for example, a keyboard, a pointing device, a mouse, a stylus, a gyroscope, an accelerometer, a position detector, or an audio input device. Stored in memory device 404 are, for example, computer readable instructions for providing a user interface to a user and receiving and processing input from the user via display 160 (e.g., a touch screen). Such a user interface may include, among other possibilities, a web browser and client software application (app).

Figure 5:
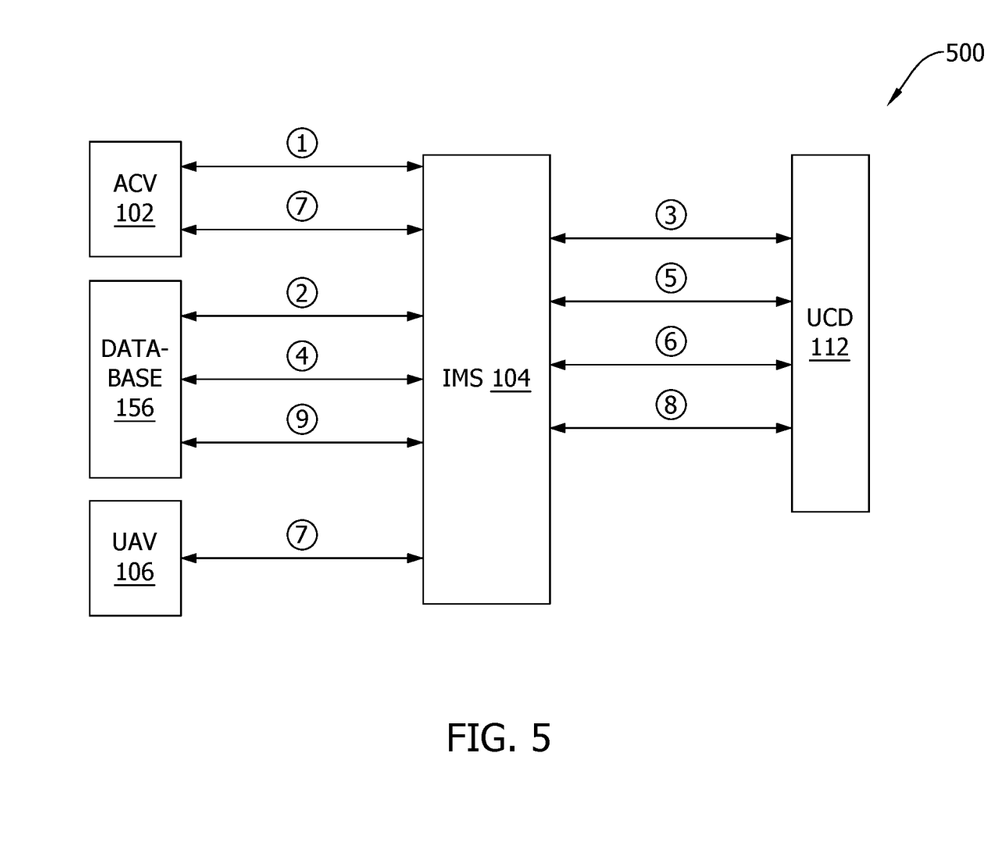
FIG. 5 is a flow diagram illustrating the flow of data between components of the delivery system shown in FIG. 1, to implement a dynamic purchase interface.
Figure 6:
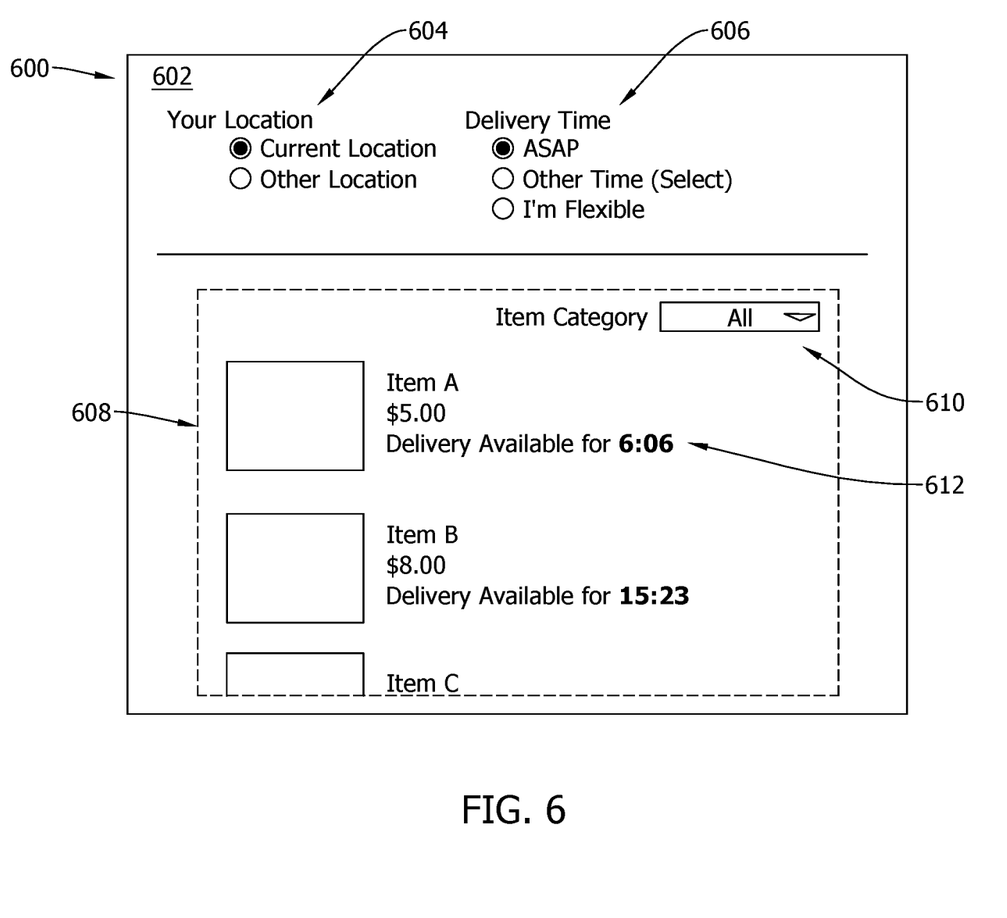
FIG. 6 is a simplified illustration of a dynamic purchase interface in accordance with the present disclosure.

FIG. 5 is a schematic flow diagram illustrating the flow of data between components of delivery system 100, to implement a dynamic purchase interface 600, as depicted in FIG. 6.

In the example embodiment, in step (1), IMS 104 interacts with ACV 102 (e.g., autonomy computing system 120) to identify inventory 122 carried by ACV 102 and route details of a predefined (automated) travel route of ACV 102. In step (2), this information is stored in database 156, in part, as inventory records. Specifically, IMS 104 stores, in database 156 (or any other suitable memory to which IMS 104 is communicatively coupled) for each inventory unit 124 within an ACV 102, an inventory record, each inventory record respectively including an identifier of the inventory unit 124, a location of the inventory unit 124 within ACV 102, and a status of the inventory unit. Step (1) may be iterated continuously or at periodic intervals (e.g., once per ten minutes, per hour, per day, etc.), to ensure IMS 104 has the most up-to-date travel information associated with ACV 102. Specifically, IMS 104 may monitor the location of ACV 102 as ACV 102 travels along its predetermined travel route. Likewise, step (2) may be iterated continuously or at periodic intervals, to ensure database 156 includes the most up-to-date information related to inventory 122 and ACV 102.

The consumer interacts with client device 112 to access the on-demand purchase app. In the example embodiment, when the on-demand purchase app is executed at client device 112, client device 112 transmits, in step (3), a request message to IMS 104, requesting IMS 104 generate the dynamic purchase interface for display within the on-demand purchase app. IMS 104 receives the request message, which includes various data elements, such as, but not limited to, a device location of client device 112 (e.g., a GPS location of client device captured by a GPS sensor integral to client device 112), a timestamp of a time and date at which the request was generated by client device 112, and a device identifier of client device 112.

IMS 104 parses the received request and, in step (4), retrieves inventory records from database 156 to identify which units 124 are indicated as available for middle-mile purchase by a consumer. Additionally, IMS 104 defines a preliminary delivery location as the device location within the request, under an initial assumption that the user of client device 112 is interested in which items are available for delivery to their current location. As described herein, the delivery location is readily updated by the user using the dynamic purchase interface. In some embodiments, a delivery time is initially defined, by IMS 104, to be "ASAP", or within some threshold period of time relative to the timestamp of the request, under an initial assumption that the user of client device 112 is interested in prompt delivery of the items. In some embodiments, IMS 104 defines a preliminary availability location of unit(s) 124 as a rolling geofence around the location of the ACV 102 on which the units 124 are carried, according to the travel route of ACV 102.

IMS 104 executes modules 150, 152, 154 (shown in FIG. 1), for example, using information contained in the request message to generate preliminary availability information and transmits, in step (5), the preliminary availability information to client device 112. As such, IMS 104 causes display of the preliminary availability information at client device 112 as a populated dynamic purchase interface within the on-demand purchase app. The preliminary availability information includes, for example, a subset of the inventory units that are available for delivery to the delivery location (e.g., the device location of client device 112) at a delivery time (e.g., a threshold window of time relative to the timestamp of the request).

The user of client device 112 interacts with the dynamic purchase interface to view available items as well as change the availability criteria, including delivery location, delivery time, category of items, and the like. IMS 104 repeats steps (4) and (5) in real-time in response to changing user input received from client device 112, such that the interface displayed to the user at client device 112 is up-to-date relative to the user's inputs. For example, in some embodiments, IMS 104 identifies the subset of units 124 that are available to purchase by the consumer (using client device 112) by computing an availability geofence around the device location of client device 112 and, based on the location of ACV 102 along the travel route, comparing the rolling geofence to the availability geofence. IMS 104 then re-populates the dynamic purchase interface to display the units 124 with availability within the overlap of the geofences. As another example, IMS 104 receives a user-selected delivery location or user-selected delivery time different from the delivery location/time defined based on the initial request. IMS 104 determines the subset of units 124 available based on those user-selected inputs and re-populates the dynamic purchase interface accordingly.

In the example embodiment, IMS 104 receives an order message from client device 112, in step (6). The order message includes a purchased unit identifier of a purchased inventory unit 124 from the subset of available inventory units 124, the delivery location, and the delivery time. In response, in step (7), IMS 104 sends control signals to components onboard ACV 102, such as inventory handlers 130, and to UAV 106 or UAV control system (all shown in FIG. 1). The control signals cause inventory handlers 130 to prepare the purchase unit(s) 124 for retrieval by UAV 106, as described herein, and cause UAV control system 108 to control UAV 106 to conduct retrieval and delivery of the unit(s) 124.

In step (8), IMS 104 generates and transmits an order confirmation to client device 112 for display within the on-demand purchase app. The order confirmation includes typical confirmation details, such an order number and a confirmation of the purchase units, the delivery location, and the delivery time. Additionally, in step (9), IMS 104 stores a record of the order in database 156. For example, IMS 104 updates inventory records to reflect the status of the purchase units (e.g., as purchased or otherwise unavailable).

IMS 104 may perform any of the above steps for inventories 122 across a fleet of ACVs 102. In some embodiments, IMS 104 may be configured to recommend different delivery locations, different delivery times, or items within other ACVs 102, when user-selected parameters return no available units, or when an order cannot be fulfilled using the user-selected parameters. IMS 104 may identify alternatives within certain thresholds (e.g., within a threshold distance of a user-selected delivery location, within a threshold time range surrounding a user-selected delivery time) and display those alternatives as prompts within the on-demand purchase app.

Additionally, IMS 104 may access stored records in database 156, including historical or previous order records, to perform analyses of previous or historical order data. IMS 104 may identify purchase trends across inventories 122 and ACVs 102. IMS 104 may provide these analyses to any relevant party (e.g., a merchant or manufacturer) to recommend what items to stock in ACVs 102, which routes are the most profitable or active, etc. In some embodiments, IMS 104 may leverage the analyses to reformat the dynamic purchase interface, such as by sorting items according to their purchase frequency.

FIG. 6 depicts an example embodiment of a dynamic purchase interface 600 in accordance with the present disclosure. Interface 600 is displayed, for example, within an on-demand purchase app 602 displayed on display 160 of remote client device 112 (shown in FIG. 1), in response to the on-demand purchase app 602 being executed on client device 112. In particular, IMS 104 is configured to cause display of interface 600 at client device 112.

In the example embodiment, interface 600 includes a location selection 604, which enables the user of client device 112 to select or input a desired delivery location. In some embodiments, a current location may be the default selection and is used to populate the initially displayed listing 608 of available inventory on interface 600.

Interface 600 also includes a time selection 606, which enables the user of client device 112 to select or input a desired delivery time. In some embodiments, "ASAP" is a default selection and is used to populate the initially displayed listing 608 of available inventory on interface 600 (e.g., using the time the request for interface 600 is generated by client device 112 or received at IMS 104).

Listing 608 of available inventory is dynamically populated (e.g., by IMS 104) based on the inputs from user in delivery location and delivery time selections 604, 606. Listing 608 is also dynamically populated based on other factors and inputs, such as an item category selection 610, the current location of ACV 102 along its travel route, and the status, location, and delivery capabilities of UAV(s) 106 that service ACV 102.

Listing 608 includes an identification of which items are available at the defined location/time, as well as corresponding item descriptions 612. Item descriptions 612 include an identifier of the item, an item price, and, in some embodiments, a time limit in which the item must be purchased to meet the delivery location/time selections. For example, IMS 104 calculates an interval of time over which the item will remain available, before the ACV 102 (including the item as inventory 122) exits an availability geofence around the delivery location. The time limit may be displayed as a real-time countdown and, in some embodiments, may be absolute or may include a buffer period of time (e.g., one minute or two minutes) to accommodate a checkout procedure.

An example technical effect of the methods, systems, and apparatus described herein includes at least one of: (a) enabling on-demand, real-time inventory purchase, order fulfillment, and delivery of cargo from an in-motion cargo vehicle to an intermediate delivery location; (b) enabling inventory management within an in-motion cargo vehicle; (c) controlling a UAV to perform pick-up operations relative to an in-motion cargo vehicle; (d) enabling the real-time determination of inventory items available for purchase relative to location, timing, and delivery capability constraints; and (e) generating a dynamic purchase interface that updates in real-time in response to user inputs and real-time availability of inventory from an in-motion cargo vehicle.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or a electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An inventory management system for generating a dynamic purchase interface within an on-demand purchase app installed and executed on a client device communicatively coupled to the inventory management system, the inventory management system comprising at least one processor communicatively coupled to at least one memory device and at least one communication interface, the at least one processor programmed to:

store, for each inventory unit within an in-motion automated vehicle, an inventory record, each inventory record respectively including an identifier of the inventory unit, a location of the inventory unit within the in-motion automated vehicle, and a status of the inventory unit;

monitor a real-time location of the in-motion automated vehicle as the automated vehicle travels along a predetermined travel route;

receive, from the client device, a request for generation of the dynamic purchase interface within the on-demand purchase app executed at the client device;

in response to the request, identify a delivery location associated with the client device;

compute an availability geofence associated with the delivery location based on the real-time location along the predetermined travel route of the in-motion automated vehicle and delivery capabilities of at least one unmanned aerial vehicle (UAV) to deliver a respective inventory unit from the real-time location of the in-motion automated vehicle to the delivery location;

compute a second availability geofence around the delivery location;

continuously or periodically determine which inventory units are available for purchase and a real-time delivery period limiting a time interval over which the inventory units will remain available for purchase at the client device and subsequent delivery from their respective location within the in-motion automated vehicle to the delivery location, based at least in part on the overlap of the availability geofence and the second availability geofence; and generate the dynamic purchase interface for display within the on-demand purchase app at the client device, including populating the displayed dynamic purchase interface with the determined inventory units available for purchase and the determined real-time delivery period, to enable real-time identification to a user of the client device of the remaining time at least one of the inventory units, within the in-motion automated vehicle traveling along the predetermined travel route, will remain available.

2. The inventory management system of claim 1, wherein the request includes a device location of the client device, and wherein the at least one processor is further programmed to:

identify the delivery location as the device location of the client device; and compute the second availability geofence around the device location based on the predetermined travel route of the in-motion automated vehicle.

3. The inventory management system of claim 1, wherein the at least one processor is further programmed to:

receive, from the client device, a user-selected delivery location; and compute the second availability geofence around the user-selected delivery location based on the predetermined travel route of the in-motion automated vehicle.

4. The inventory management system of claim 1, wherein the at least one processor is further programmed to define the delivery period relative to a time of receipt of the request.

5. The inventory management system of claim 1, wherein the at least one processor is further programmed to:
   receive, from the client device, a user-selected delivery time; and
   update the displayed delivery period based on the user-selected delivery time.

6. The inventory management system of claim 1, wherein the at least one processor is further programmed to:
   receive, from the client device within the time interval, an order message including a purchased unit identifier of a purchased inventory unit from the inventory units available for purchase, the delivery location, and a selected delivery time; and
   send a control signal to the UAV to initiate retrieval of the purchased inventory unit from the in-motion automated vehicle traveling along the predetermined travel route and delivery of the purchased inventory unit to the delivery location at the delivery time.

7. The inventory management system of claim 1, wherein the at least one processor is further programmed to:
   store respective inventory records and monitor respective travel routes of a plurality of automated vehicles including the in-motion automated vehicle.

8. A computer-implemented method for generating a dynamic purchase interface within an on-demand purchase app installed and executed on a client device communicatively coupled to an inventory management system, the method implemented by the inventory management system including at least one processor communicatively coupled to at least one memory device and at least one communication interface, the method comprising:
   storing, for each inventory unit within an in-motion automated vehicle, an inventory record, each inventory record respectively including an identifier of the inventory unit, a location of the inventory unit within the in-motion automated vehicle, and a status of the inventory unit;
   monitoring a real-time location of the in-motion automated vehicle as the automated vehicle travels along a predetermined travel route;
   receiving, from the client device, a request for generation of the dynamic purchase interface within the on-demand purchase app executed at the client device;
   in response to the request, identifying a delivery location associated with the client device;
   computing an availability geofence associated with the delivery location based on the real-time location along the predetermined travel route of the in-motion automated vehicle and delivery capabilities of at least one unmanned aerial vehicle (UAV) to deliver a respective inventory unit from the real-time location of the in-motion automated vehicle to the delivery location;
   computing a second availability geofence around the delivery location;
   continuously or periodically determining which inventory units are available for purchase and a real-time delivery period limiting a time interval over which the inventory units will remain available for purchase at the client device and subsequent delivery from their respective location within the in-motion automated vehicle to the delivery location, based at least in part on the overlap of the availability geofence and the second availability geofence; and
   generating the dynamic purchase interface for display within the on-demand purchase app at the client device, said generating comprising populating the dynamic purchase interface with the determined inventory units available for purchase and the determined real-time delivery period, to enable real-time identification to a user of the client device of the remaining time at least one of the inventory units, within the in-motion automated vehicle traveling along the predetermined travel route, will remain available.

9. The computer-implemented method of claim 8, wherein the request includes a device location of the client device, the method further comprising:
   initially identifying the delivery location as the device location of the client device; and
   computing the second availability geofence around the device location based on the predetermined travel route of the in-motion automated vehicle.

10. The computer-implemented method of claim 9, further comprising:
    receiving, from the client device, a user-selected delivery location; and
    re-computing the second availability geofence around the user-selected delivery location.

11. The computer-implemented method of claim 8, further comprising defining the delivery period relative to a time of receipt of the request.

12. The computer-implemented method of claim 11, further comprising:
    receiving, from the client device, a user-selected delivery time; and
    updating the displayed delivery period based on as the user-selected delivery time.

13. The computer-implemented method of claim 8, further comprising:
    receiving, from the client device within the time interval, an order message including a purchased unit identifier of a purchased inventory unit from the inventory units available for purchase, the delivery location, and a selected delivery time; and
    sending a control signal to the UAV to initiate retrieval of the purchased inventory unit from the in-motion automated vehicle traveling along the predetermined travel route and delivery of the purchased inventory unit to the delivery location at the delivery time.

14. The computer-implemented method of claim 8, further comprising:
    storing respective inventory records and monitoring respective travel routes of a plurality of automated vehicles including the in-motion automated vehicle.

15. An on-demand delivery system comprising:
    an unmanned aerial vehicle (UAV) associated with an in-motion automated vehicle traveling along a predetermined travel route; and
    an inventory management system for generating a dynamic purchase interface within an on-demand purchase app installed and executed on a client device communicatively coupled to the inventory management system, the inventory management system configured to:
        store, for each inventory unit within the in-motion automated vehicle, an inventory record, each inventory record respectively including an identifier of the inventory unit, a location of the inventory unit within the in-motion automated vehicle, and a status of the inventory unit;
monitor a real-time location of the in-motion automated vehicle as the automated vehicle travels along the predetermined travel route;
receive, from the client device, a request for generation of the dynamic purchase interface within the on-demand purchase app executed at the client device;
in response to the request, identify a delivery location associated with the client device;
compute an availability geofence associated with the delivery location based on the real-time location along the predetermined travel route of the in-motion automated vehicle and delivery capabilities of the UAV to deliver a respective inventory unit from the real-time location of the in-motion automated vehicle to the delivery location;
compute a second availability geofence around the delivery location;
continuously or periodically determine which inventory units are available for purchase and a real-time delivery period limiting a time interval over which the inventory units will remain available for purchase at the client device and subsequent delivery from their respective location within the in-motion automated vehicle to the delivery location, based at least in part on the overlap of the availability geofence and the second availability geofence;
generate the dynamic purchase interface for display within the on-demand purchase app at the client device including populating the displayed dynamic purchase interface with the determined inventory units available for purchase and the determined real-time delivery period;
receive, from the client device, an order message including a purchased unit identifier of a purchased inventory unit from the inventory units available for purchase, the delivery location, and a selected delivery time; and
transmit a control signal to the UAV to initiate retrieval of the purchased inventory unit from the in-motion automated vehicle traveling along the travel route and delivery of the purchased inventory unit to the delivery location at the delivery time.

16. The on-demand delivery system of claim 15, wherein the UAV is configured to operate according to the control signal to retrieve the purchased inventory unit from the in-motion automated vehicle and deliver the purchased inventory unit to the delivery location at the delivery time.

17. The on-demand delivery system of claim 15,
wherein the inventory management system is further configured to:
receive a plurality of order messages including the order message; and
transmit a corresponding plurality of control signals including the control signals to the UAV; and
wherein the UAV is further configured to:
operate according to the plurality of control signals to retrieve a corresponding plurality of purchased units from the in-motion automated vehicle and deliver the plurality of purchased units to respective delivery locations.

* * * * *